Jan. 17, 1928.
H. F. SMITH
1,656,836
APPARATUS FOR EFFECTING HEAT TRANSFER
Filed March 16, 1922     2 Sheets-Sheet 1
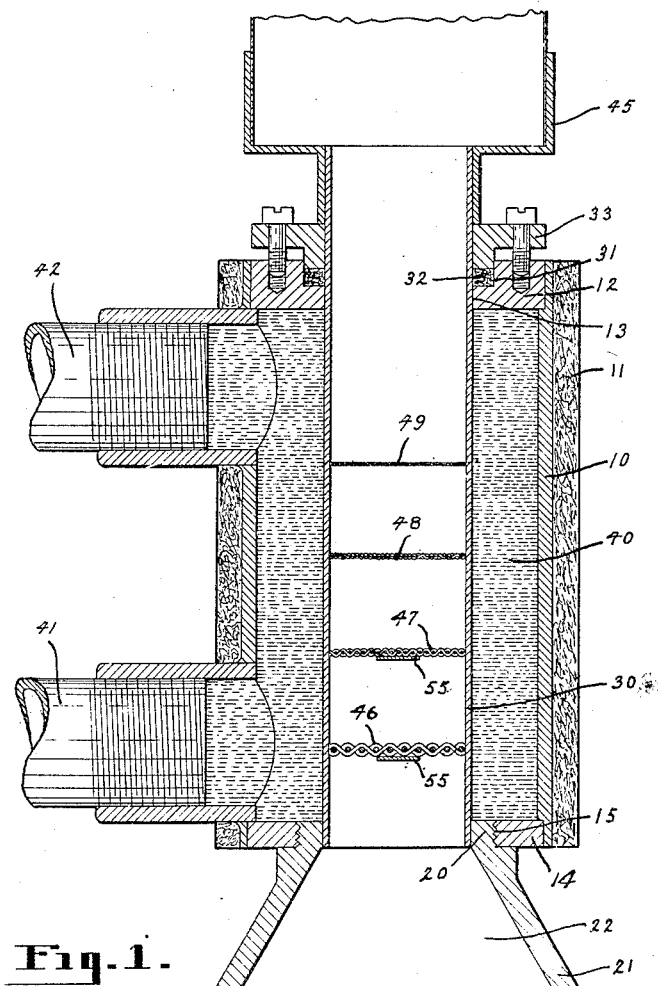
Fig.1.
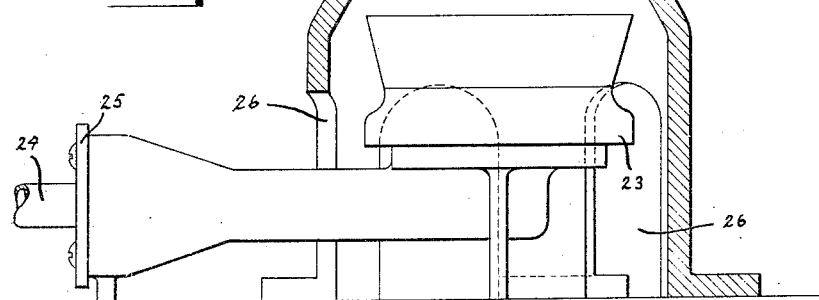
Witnesses
Charles E. Greene
Edmund C. Sylvis
Inventor
Harry F. Smith
By [signature]
Attorney

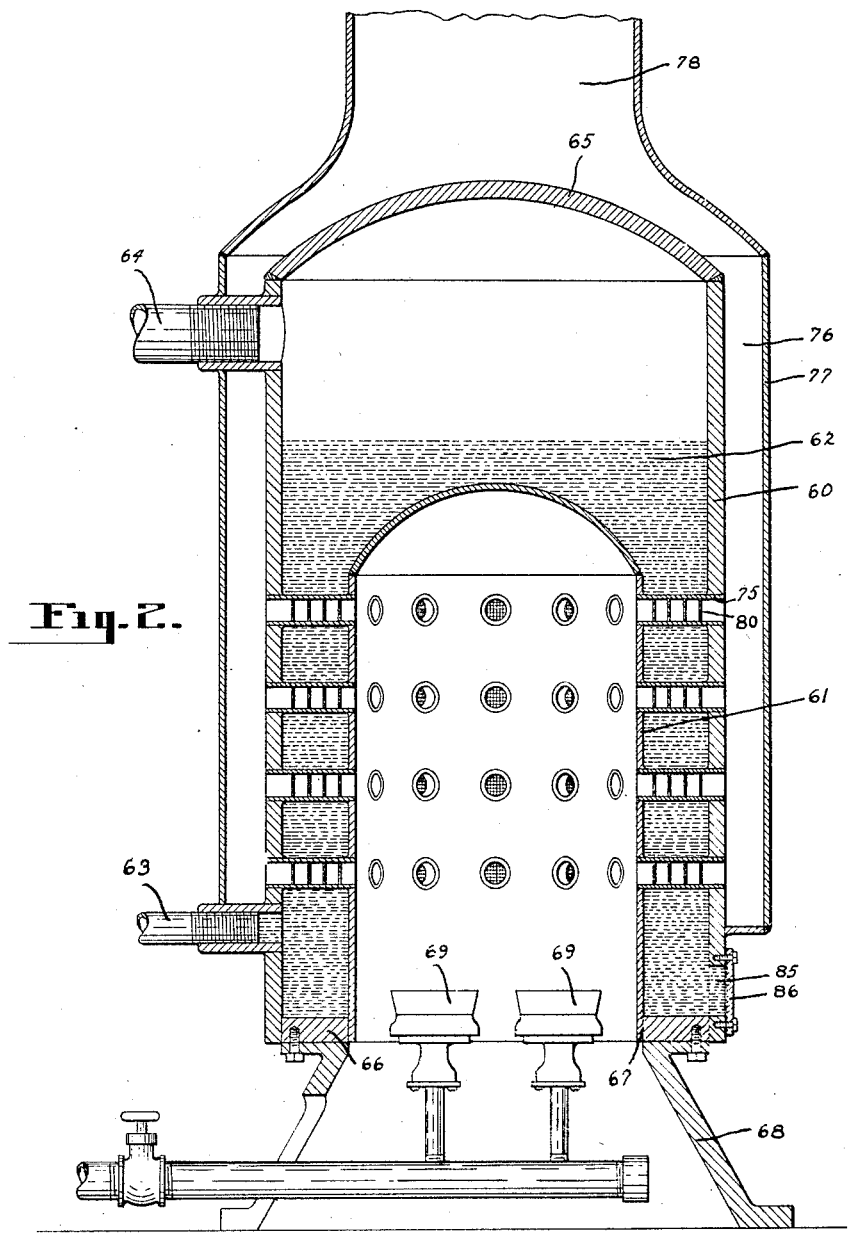

Patented Jan. 17, 1928.

1,656,836

UNITED STATES PATENT OFFICE.

HARRY F. SMITH, OF DAYTON, OHIO, ASSIGNOR TO THE GAS RESEARCH COMPANY, OF DAYTON, OHIO, A CORPORATION OF OHIO.

APPARATUS FOR EFFECTING HEAT TRANSFER.

Application filed March 16, 1922. Serial No. 544,256.

This invention relates to heat transfer, and more particularly to the transfer of heat in connection with heating apparatus, such as boilers, and the like.

One of the principal objects of this invention is to provide an improved form of heat-transferring apparatus, particularly adapted for heating water to provide hot water or steam, which apparatus is simple and cheap in construction, efficient in operation, and of small size when compared to other forms of water-heating apparatus of the same capacity.

Other objects and advantages of the invention will be apparent from the description thereof set out below when taken in connection with the accompanying drawing.

In the drawing in which like characters of reference designate like parts throughout the several views thereof;

Fig. 1 is a sectional view of a simple form of boiler constructed in accordance with this invention; and Fig. 2 is a sectional view through a modified form of construction.

This method of heat transfer is of general application; but for purposes of description it is illustrated as being employed in the transfer of heat from heated gases, such as heated products of combustion, into water to heat that water for use in a household hot water system or to generate steam. And in Fig. 1 is shown a simple, but very effective and efficient, type of apparatus constructed for carrying on this method of heat transfer.

In that figure the numeral 10 designates the outer shell of a water heater or boiler which is preferably covered with suitable lagging, to cut down heat losses from the shell by radiation into the atmosphere, this lagging being shown as entirely conventional in construction and designated by the numeral 11. The upper end of the boiler is closed by means of the head 12, having a centrally arranged opening 13 therein. The lower end of the boiler is closed by means of the head 14 which has a centrally arranged opening 15 therein. This opening 15 is internally threaded and is adapted to receive a correspondingly threaded extension 20, carried by the member 21, which serves to support the boiler and to also receive within its hollow interior 22, the burner 23. While this burner may be of any desired construction it is shown as being of the induction type, fuel, of any desired character such as gas, oil and the like, being introduced through the pipe 24 and drawing in at the same time, air in the proper proportion, through openings within the plate 25, which openings are not shown inasmuch as this type of burner is of conventional construction. A plurality of openings 26 are provided in the member 21 through which air for combustion is admitted to supplement the supply of air entering through the air ports in the plate 25.

Rigidly secured within the opening in the extension 20 is a tube 30, preferably of copper, though it may be of brass or aluminum or any other material which is a good conductor of heat. And by the term "good conductor of heat" is meant some metal which is a better conductor of heat than iron. The practice of this method does not necessarily involve the use of a metal of high conductivity as the material for the tube 30, but the effectiveness and efficiency of the method of heat transfer is materially increased if a metal of this character is used.

This tube 30 is so constructed that when the extension 20 is threadedly engaged within the opening 15 the upper end of the tube will extend through the opening 13 in the upper head 12. The head 12 is provided with a pocket 31, therein, which serves as a stuffing box, to receive packing 32, which may be of any conventional character. The gland 33 extends into the stuffing box for compressing the packing to effect a tight joint and prevent leakage of water or steam from within the boiler 10 through the opening 13, suitable stud bolts extending through the gland 33 and being threadedly mounted within sockets in the member 12, to give any desired compression of the packing.

The members 10 and 30 are preferably cylindrical, and coaxial, a space 40 thus being provided between these two members which is adapted to contain the water to be heated, and also to contain any steam, where the generation of steam is desired. Water enters the space 40 through the pipe 41, which opens into the lower end of that space, the heated water or generated steam passing off through the pipe 42 which is connected to the upper end of the space 40.

As shown the apparatus is adapted to function as the hot water heater of a household water supply system, the hot water from the space 40, during the usual circulation passing through the pipe 42 to the place of use or storage, and the cooler water returning through the pipe 41. If desired the pipe 42 may be connected to the steam heating system of a house, or the like, then serving to conduct live steam from the space 40 to the radiators within the house, the pipe 41 being also connected to these radiators and serving to return to the space 40 the steam condensed within the radiators, the conventional closed system being thus provided. In this case, of course, the space 40 will be only partially filled with water. Any desired means of introducing make-up water to the boiler may be provided. For example the pipe 41 may have a branch thereof connected to any suitable source of supply of water, so that as desired fresh water may be introduced to the boiler.

The upper end of the pipe 30 preferably extends entirely through the head 12 and is adapted to receive the lower end of the member 45, which is connected to the flue or stack, so that the products of combustion from the burner, will pass upwardly through the pipe 30 and thence to flue or stack. No difficulty is ordinarily encountered in apparatus of this general character in getting an adequate and free transfer of heat from the heated metal of the tube 30 into the water, but the difficulty is in securing a correspondingly effective and efficient transfer from the hot products of combustion into the tube 30. To secure this desired transfer there are positioned within the pipe 30, and uniformly spaced from each other, several screens or partitions, which are so constructed as to divide the hot products of combustion passing upwardly through the pipe 30 into fine streams, so that substantially every part of the hot gases passing through the tube 30 will be brought into heat transferring relation with some part of the screens. The method of attaching the screens to the tube should be such that transfer of heat from the screens to the tube will not be interfered with. One satisfactory way of thermally connecting the screens to the tube is by soldering, though, of course, other ways may be used if desired. In addition to that construction which will cause such intimate contact of the hot gases with the surfaces of the screens, these screens should also be so constructed that they have sufficient conductive capacity to readily transfer to the tube 30 the heat absorbed by their surfaces. That is to say, it is not enough that the screens shall be so constructed as to come into heat transferring contact with the entire volume of the hot gases passing through the tube 30, but, in order to secure the greatest efficiency these screens must also be so constructed that the conductive capacity of the screens is sufficient to readily carry away to the tube 30 all of the heat which tends to pass into them from the hot gases within the tube. While these screens may have a variety of forms, so long as they effect this desired result, they are preferably made of ordinary copper gauze or wire screen. Not only do screens of this sort provide a considerable number of passages or interstices which causes such dividing of the flowing gases that intimate contact of the gases and the surface of the screen is secured, but because of the shape of the wires constituting the screen, a large heat absorbing surface is exposed to the hot gases. In addition it has been found that in all ordinary screen of this character, in which the sizes of the wires forming the screen vary with variations in mesh, regardless of its mesh, the conductive capacity is substantially the same for screens of varying mesh.

This makes screen of this character particularly desirable. For, as shown in Fig. 1 the lowest screen, which is designated by the numeral 46, which is exposed to the hottest gases is of coarser mesh, and made of heavier wire, than the next higher screen 47 which is exposed to gases which have been already somewhat cooled by giving up a part of their heat to the screen 46. And likewise each of the screens 48 and 49 is of progressively increasing mesh and the wires forming such screens of correspondingly decreasing diameter. As stated above, however, with such screens, the conductive capacity is substantially constant, but as the mesh increases, and the wires forming the screen correspondingly decrease in diameter, the total absorbing surface of the screen, per unit area, materially increases. Therefore, the screens are of progressively increasing mesh, so that those screens which are exposed to the hottest gases have less surface area exposed to the gases than those screens which are exposed to the gases after they have been somewhat cooled. By means of this construction the screen 49, which is of comparatively small mesh, will take up from the gas passing thereover a quantity of heat which compares quite favorably with that taken up by the larger mesh screen 46, from the hotter gases passing over it.

In actual practice it has been found that very satisfactory results will be obtained if the screen 46 is of about six or eight mesh, the wires constituting this screen having a diameter of about .05 inch, with the other screens increasing in fineness to about thirty mesh for the screen 49, in which the wire is of a diameter of about .015. But of course screens of other sizes may be used; and it is not necessary that they be of varying mesh, though this is thought preferable. The apparatus shown in Fig. 1 is drawn to scale, and is substantially three-fourths of the full size which would be used for supplying hot water for domestic use, in the ordinary six to eight room house. By comparing the size of this boiler with the types of boilers now in general use its effectiveness and efficiency may be readily appreciated.

Of course the size of this boiler is not limited, but as the size increases the efficiency would tend to fall off with increase of the diameter of the tube 30, because beyond a certain diameter efficient conduction of the heat absorbed by the central part of the screens would not be secured. Especially is this true where, as in the construction shown in Fig. 1, there is a tendency to deflect the products of combustion entering the tube 30 toward the center of that tube, thus causing an unduly large proportion of the hot gases to pass through the center of the first screens and not enough to pass through the zone immediately adjacent the tube. As a result of this condition the centers of the lower screens become highly heated, and not only is the life of the screen thus shortened but maximum transfer of heat from the hot gases to the tube 30 is also prevented. In order to prevent this condition certain of the screens are provided with buttons or plates 55, centrally located, which prevent the passage of the hot gases through the central part of the screen thus deflecting these gases to cause them to pass through the outer zone of the screens. Ordinarily only the two lower screens need these buttons, but of course the construction of the apparatus might be such as to make it desirable that three, or more, screens be provided with them.

Where larger size boilers are desired a plurality of tubes may be used instead of the single tube 30, shown in Fig. 1. In Fig. 2 is illustrated a form of apparatus which is adapted for larger size boilers. This boiler consists of a shell 60, having a coaxially arranged inner shell 61, therein, the two shells, being so positioned relative to each other as to provide the space 62 for receiving the water to be heated, and a steam receiving space above the water level. Water is introduced into the lower end of the space 62 through the pipe 63 and steam is withdrawn from the upper end of the space 62 through the pipe 64. The upper end of the boiler is closed by means of the head 65, which is welded, or otherwise suitably secured in place the lower end being also closed by means of the head 66 which is likewise secured in place in any suitable manner the specific means of securing it in place not being shown. The head 66 is provided with an opening 67, which receives the lower end of the inner shell 61, this shell being rigidly secured, in water tight connection with the head 66 in any desired manner. The boiler is supported by means of a suitable base 68, which is shown as bolted to the head 66, although it can be made integral with the head 66 or attached to it in any other desired manner.

Induction burners 69, of any suitable character, are positioned within the lower end of the inner shell 61, the hot products of the combustion at the burners passing upwardly into the shell 61 and thence through a plurality of tubes 75 into the space 76, within the housing 77, which surrounds the member 60, the space 76 being connected to the flue 78, so that the products of combustion passing through the tubes 75 into the space 76 will pass upwardly into the flue or stack. Each of the tubes 75 is substantially identical in construction with the tube 30, of Fig. 1 described above, and is provided with a plurality of screens 80, which are similar in construction to the screens shown and described in connection with Fig. 1.

A cleanout opening 85, closed by a suitable cover member 86, is provided in the lower part of the space 62, through which sludge and sediment deposited in the space 62 may be readily removed.

The operation of this type of boiler is the same as the type of boiler described above.

As stated above this method of heat transfer is not limited to the transfer of heat into water, but is of general application. And obviously the same method of heat transfer may be applied to those cases in which it is desired to increase the radiating effect from a heated member, as well as to those cases illustrated. But whether the screens, or analogous elements, are absorbing heat or radiating heat, the arrangement should be such that the gases, or the like, which are passing over them are broken up into fine streams so that substantially all parts of these gases are brought into good thermal, or heat transferring, contact with the surfaces of the screens. And, of course, the tubes, or other members, to which the screens are attached should be brought into good thermal contact with the medium into which heat is being transmitted from, or absorbed by, them.

By way of example, a very efficient type of steam radiator may be made by surrounding a steam pipe with a casing, spaced therefrom, and providing a plurality of screens, of the character described, within the space between the steam pipe and its casing and causing a flow of air through that space. Also this method of heat transfer would function particularly well in connection with air cooled cylinders for internal combustion engines.

While the method herein described, and the forms of apparatus for carrying this method into effect, constitute preferred embodiments of the invention, it is to be understood that the invention is not limited to this precise method and forms of apparatus, and that changes may be made in either without departing from the scope of the invention which is defined in the appended claims.

What is claimed is:

1. A water heater or the like, comprising a member, composed of material which is a good conductor of heat, having one side adapted for thermal contact with the material to be heated; and a plurality of horizontally arranged absorbing fins upon the other side, the said fins being so constructed that each fin has substantially the same conducting capacity as each of the other fins, but so that the several fins have different heat absorbing surfaces exposed to the heat carrying medium.

2. A water heater or the like of the character described comprising a tubular member, adapted to receive heat from a heat carrying medium passing therethrough; and a plurality of heat absorbing members within said tubular member, over which the heat carrying medium passes, as it passes through the said tubular member, all of the said heat absorbing members having substantially the same conductive capacity, but each of the said members having a different absorbing surface.

3. A water heater or the like of the character described, comprising a tubular member adapted to receive heat from a heat carrying medium passing therethrough; and a plurality of perforated screens therein, composed of material which is a good conductor of heat, the screens being so constructed that all of the screens have substantially the same conductive capacity, but that screen with which the heat carrying medium first contacts has the least surface area, the succeeding screens having progressively increasing surface areas.

4. A water heater or the like of the character described, comprising a tubular shell; a tube composed of material which is a good conductor of heat positioned within said tubular shell and spaced therefrom to provide a water receiving space; a plurality of copper gauze partitions within said tube, and in good thermal connection therewith, all of the said partitions having substantially the same conductive capacity, but the successive partitions being composed of gauze of varying mesh, the arrangement being such that the partitions are of progressively increasing mesh; and means for passing a heat carrying medium through the tube, and the partitions therein, the partitions being so arranged that the successive partitions present increasing surface areas to the heat carrying medium passing therethrough.

5. A water heater or the like of the character described, comprising a tubular shell; a tube, composed of a material which is a good conductor of heat, spaced from said shell, to provide a water receiving space; and a plurality of partitions within said tube, said partitions being composed of copper gauze, the lowermost of said partitions being substantially eight mesh, and each succeeding partition being of progressively increasing mesh, with the uppermost substantially thirty mesh.

6. A water heater or the like, of the character described, comprising a tubular shell; a second tubular shell positioned therein, with the walls of the two shells spaced apart to form a water receiving space, inlet and outlet pipes connected to said space; a plurality of tubes, composed of material which is a good conductor of heat, positioned between the two shells, one end of each of the tubes opening into the space within the inner of the said tubular shells and the other end of each of the said tubes opening into the space around the outer of said tubular shells; and a plurality of wire screens within each of said tubes and thermally connected to said tubes, said screens being composed of material which is a good conductor of heat, and each succeeding screen being of progressively increasing mesh.

7. A water heater or the like, of the character described, comprising a heat conducting member, having one side thereof adapted for thermal contact with the heat carrying medium; a perforated partition positioned within said heat conducting member, and a centrally arranged plate carried by said partition for deflecting heated gas passing through it toward the outer portion of said perforated partition.

8. A water heater or the like, of the character described, comprising a tubular member, having one side thereof adapted for thermal contact with hot gases or the like, and a perforated screen arranged across the path of travel of the hot gases and constructed to divide the said gases into fine streams to effect intimate contact of the said gases with the surface of the screen, the screen being so proportioned and so connected to the said tubular member that it has a heat transferring capacity commensurate with its heat absorbing capacity.

9. A water heater or the like, of the character described, comprising a tubular member adapted to have heated gases pass therethrough, a plurality of heat-conducting screens positioned in spaced relation, the heating medium passing through said tubular member thus passing over the said screens, and a centrally arranged deflecting plate carried by the lower of said screens for deflecting the heated medium passing over said screens toward the outer portion thereof.

10. A water heater or the like of the character described, comprising a member which is a good conductor of heat, having one side adapted for thermal contact with a medium to be heated, and the other side in contact with a heating medium, and a plurality of heat transferring members associated with said conducting member and in thermal connection therewith, the said heat transferring members being so constructed that each heat transferring member has substantially the same heat conducting capacity as each of the other members, but each of the said members has a different surface area, the heat transferring members being so arranged that the successive members in the direction of flow of the medium passing in contact therewith present increasing surface areas to the said medium.

In testimony whereof I hereto affix my signature.

HARRY F. SMITH.